(12) United States Patent
Tetreault et al.

(10) Patent No.: US 6,830,068 B2
(45) Date of Patent: Dec. 14, 2004

(54) VACUUM GENERATING METHOD AND DEVICE INCLUDING A CHARGE VALVE

(75) Inventors: Kevin Tetreault, Blenheim (CA); John Derikx, Windsor (CA)

(73) Assignee: Siemens VDO Automotive, Inc., Chatham (CA)

( * ) Notice: Subject to any disclaimer, the term of this patent is extended or adjusted under 35 U.S.C. 154(b) by 0 days.

(21) Appl. No.: 10/232,530

(22) Filed: Sep. 3, 2002

(65) Prior Publication Data

US 2003/0041647 A1 Mar. 6, 2003

Related U.S. Application Data

(60) Provisional application No. 60/315,979, filed on Aug. 31, 2001.

(51) Int. Cl.[7] ............................................. G01L 27/00
(52) U.S. Cl. ................ 137/565.23; 73/1.58; 73/118.1; 141/65
(58) Field of Search ............................ 137/565.23, 605, 137/606; 141/65; 73/1.58, 37, 1.71, 1.35, 118.1

(56) References Cited

U.S. PATENT DOCUMENTS

| | | | | |
|---|---|---|---|---|
| 790,730 | A | * | 5/1905 | Hoelscher .................... 141/65 |
| 1,726,766 | A | * | 9/1929 | Rector ......................... 141/65 |
| 2,569,032 | A | * | 9/1951 | Washburn .............. 137/565.23 |
| 2,998,256 | A | * | 8/1961 | Lipkins ................. 137/565.23 |
| 3,373,597 | A | * | 3/1968 | Simons, Jr. .................. 73/1.58 |
| 4,632,157 | A | * | 12/1986 | Bunkofske ................... 141/65 |
| 5,433,238 | A | * | 7/1995 | Cannizzaro et al. .......... 141/65 |
| 6,062,066 | A | * | 5/2000 | Loen ............................. 73/37 |
| 6,460,566 | B1 | | 10/2002 | Perry et al. ................. 137/495 |

OTHER PUBLICATIONS

U.S. Appl. No. 10/235,528, Tetreault et al., filed Sep. 3, 2002, Vacuum Generating Method and Device.
U.S. Appl. No. 10/235,529, Tetreault et al., filed Sep. 3, 2002, Vacuum Generating Method and Device Including a Charge Valve and Electronic Control.

* cited by examiner

Primary Examiner—John Rivell

(57) ABSTRACT

A vacuum generating device and method include a member defining a passage, a first valve, a second valve, and a fluid communication conduit. The passage extends between a first end and a second end, and includes a constriction defining an orifice. The first valve connects the first end of the member and an ambient environment. The first valve is adjustable between first and second configurations. The first configuration permits generally unrestricted fluid flow between the orifice and the ambient environment. The second configuration substantially prevents fluid flow between the orifice and the ambient environment. The second valve has a first port and a second port. The first port is adapted for fluid communication with a pressure source at a first pressure level. The fluid communication conduit connects the second end of the member and the second port of the second valve. The fluid communication conduit includes a fluid communication tap at a second pressure level. The second pressure level is responsive to fluid flow through the orifice.

13 Claims, 2 Drawing Sheets

VACUUM GENERATING METHOD AND DEVICE INCLUDING A CHARGE VALVE

CROSS-REFERENCE TO RELATED APPLICATIONS

This application claims priority of provisional application No. 60/315,979 filed on 31 Aug. 2001.

FIELD OF THE INVENTION

This disclosure is generally directed to a device and a method for generating vacuum. In particular, this disclosure is directed to a device, which includes a charge valve, and a method for generating vacuum used to test a vacuum detection device.

BACKGROUND OF THE INVENTION

It is frequently desirable to test the performance of a component prior to installing the component in its intended environment. An integrated pressure management system is an example of such a component that may be tested before being installed on a vehicle. The integrated pressure management system performs a vacuum leak diagnostic on a headspace in a fuel tank, a canister that collects volatile fuel vapors from the headspace, a purge valve, and all the associated hoses and connections.

It is desirable to test components in an environment that simulates the intended operating environment. A simulated environment that is suitable for testing the vacuum leak diagnostic of integrated pressure management systems can include an adjustable vacuum level.

Known vacuum generating methods suffer from a number of disadvantages including the inability to generate vacuum levels in the desired testing range (i.e., conventional vacuum generators are not stable below two inches of water), the inability to precisely control the vacuum level, and the inability to perform a test in an acceptable period.

It is believed that there is needed to provide a device and a method that overcome the disadvantages of conventional vacuum generators.

SUMMARY OF THE INVENTION

The present invention provides a device for drawing a vacuum relative to an ambient environment. The device includes a member that defines a passage, a first valve, a second valve, and a fluid communication conduit. The passage extends between a first end and a second end, and includes a constriction that defines an orifice. The first valve connects the first end of the member and an ambient environment. The first valve is adjustable between first and second configurations. The first configuration permits generally unrestricted fluid flow between the orifice and the ambient environment. The second configuration substantially prevents fluid flow between the orifice and the ambient environment. The second valve has a first port and a second port. The first port is adapted for fluid communication with a pressure source at a first pressure level. The fluid communication conduit connects the second end of the member and the second port of the second valve. The fluid communication conduit includes a fluid communication tap at a second pressure level. The second pressure level is responsive to fluid flow through the orifice.

The present invention also provides a method of testing a vacuum detection device. The method includes providing a pressure source at a first pressure level, drawing a vacuum relative to an ambient environment with a vacuum generating device, connecting the vacuum detection device to a fluid communication tap, evacuating to the second pressure level a fluid communication conduit and the fluid communication tap, and regulating the second pressure level in response to varying fluid flow through an orifice. The vacuum-generating device includes a member defining a passage, a first valve, a second valve, and the fluid communication conduit. The passage extends between a first end and a second end, and includes a constriction that defines the orifice. The first valve connects the first end of the member and the ambient environment. The first valve is adjustable between first and second configurations. The first configuration permits generally unrestricted fluid flow between the orifice and the ambient environment. The second configuration substantially prevents fluid flow between the orifice and the ambient environment. The second valve has a first port and a second port. The first port is in fluid communication with the pressure source at a first pressure level. The fluid communication conduit connects the second end of the member and the second port of the second valve. The fluid communication conduit includes the fluid communication tap at a second pressure level.

BRIEF DESCRIPTIONS OF THE DRAWINGS

The accompanying drawings, which are incorporated herein and constitute part of this specification, illustrate embodiments of the invention, and, together with the general description given above and the detailed description given below, serve to explain the features of the invention.

DETAILED DESCRIPTION OF THE PREFERRED EMBODIMENT

As it is used herein, "pressure" is measured relative to the ambient environment pressure. Thus, positive pressure refers to pressure greater than the ambient atmospheric pressure and negative pressure, or "vacuum," refers to pressure less than the ambient environment pressure. As used herein, the term "fluid" can refer to a gaseous phase, a liquid phase, or a mixture of the gaseous and liquid phases. The term "fluid" preferably refers to the gaseous phase of a volatile liquid fuel, e.g., a fuel vapor.

Figure 1:
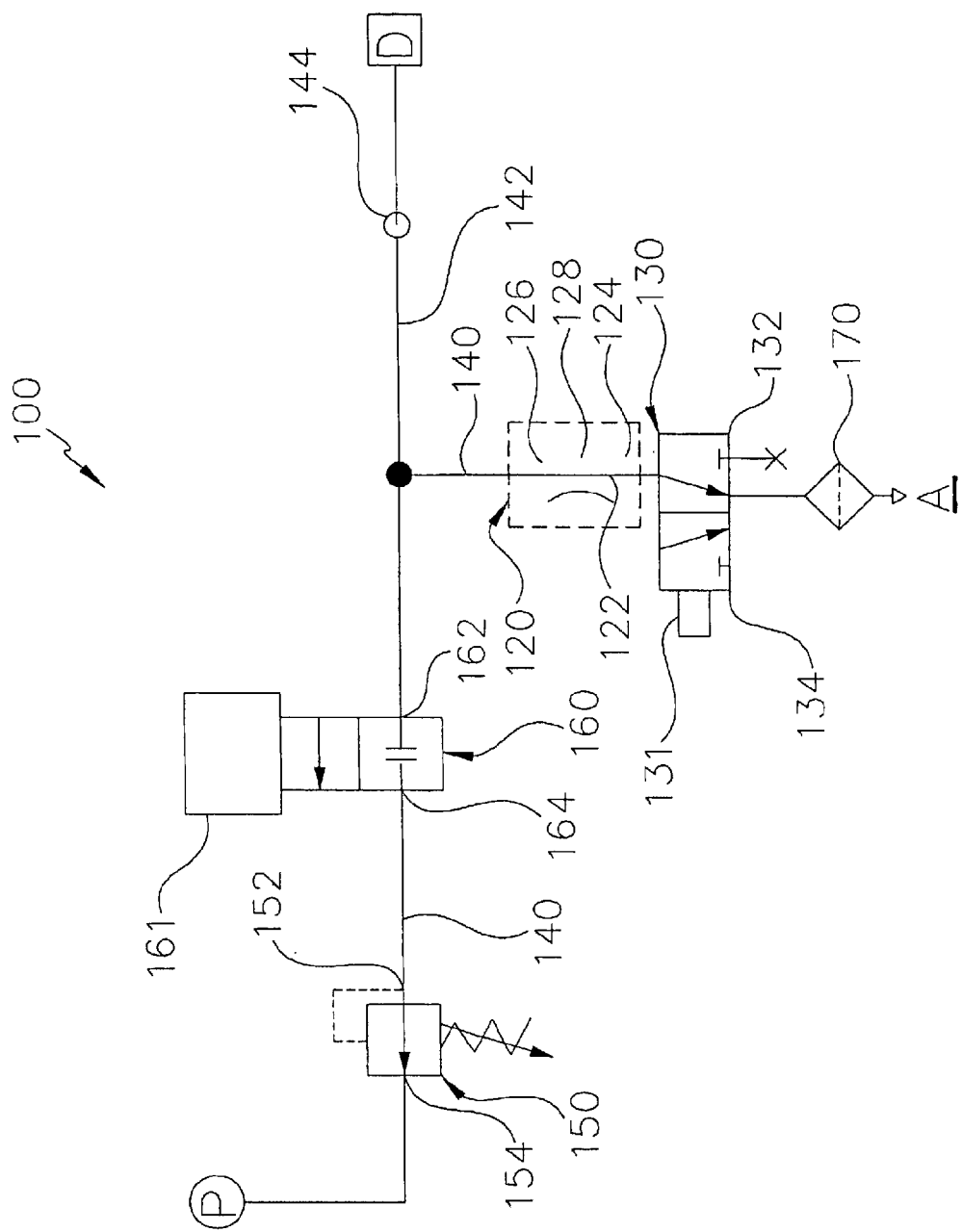
FIG. 1 is a schematic representation of an embodiment of a vacuum-generating device.

Referring to FIG. 1, a vacuum-generating device 100 includes a member 120, a charge valve 130, a flow valve 160, and a fluid conduit 140. The member 120 defines a passage 122 extending between an upstream end 124 and a downstream end 126. The passage 122 includes a constriction that defines an orifice 128. The orifice 128 can be a Bernoulli-type head-loss device, which partially obstructs fluid flow and causes a pressure drop. Other Bernoulli-type head-loss devices include flow nozzles and venturi tubes.

The charge valve 130 connects the upstream end 124 of the member 120 and an ambient environment A. The charge valve 130 can include a first actuator 131, which can be a mechanical linkage, for example, as a lever or a threaded-rod and nut. The charge valve 130 is adjustable between an open configuration 132 and a closed configuration 134. The open configuration 132 of the charge valve 130 permits generally unrestricted fluid flow between the member 120 and the ambient environment A. The closed configuration 134 of the charge valve 130 substantially prevents fluid flow between the member 120 and the ambient environment A. A filter 170 can be disposed in fluid communication between the charge valve 130 and the ambient environment A. In the open configuration 132 of the charge valve 130, the generally unrestricted fluid flow passes through the filter 170.

The flow valve 160 can be a proportional flow valve and includes an inlet port 162 and an outlet port 164. The flow valve 160 can include a second actuator 161, which can also be a mechanical linkage. The outlet port 164 is adapted for fluid communication with a pressure source P, e.g. a vacuum source, at a first pressure level.

The fluid conduit 140 connects the downstream end 126 of the member 120 and the inlet port 162 of the flow valve 160. The fluid conduit 140 includes a fluid tap 142 at a second pressure level. The second pressure level is responsive to fluid flow through the member 120. The fluid tap 142 can terminate at a connector 144, which can include a seal adapted for coupling with a vacuum detection device D.

The charge valve 130 and the flow valve 160 can be adjustable such that pressure in the fluid conduit 140 changes at a first rate during a first portion of a test period, and the pressure in the fluid conduit 140 changes at a second rate during a second portion of the test period. Preferably, the test period is less than 30 seconds. Most preferably, the test period is for up to approximately ten seconds. The first rate is greater than the second rate. During the first portion of the test period, the charge valve 130 is in the closed configuration 134 and the pressure in the fluid conduit 140 approaches the second pressure level from the ambient environment. During the second portion of the test period, the charge valve 130 is in the open configuration 132 and the pressure in the fluid conduit 140 progresses through the second pressure level. The second pressure level is regulated during the second portion of the test period in response to the flow valve 160 varying the fluid flow through the member 120.

The vacuum-generating device 100 can include a pressure regulator 150. The pressure regulator 150 can be disposed downstream of the flow valve 160. The pressure regulator 150 has an inlet 152 and an outlet 154. The outlet 154 of the pressure regulator 150 is adapted for fluid communication with the pressure source P. The inlet 152 of the pressure regulator 150 can be in fluid communication with the outlet port 164 of the flow valve 160.

The pressure regulator 150 can change the first pressure level to an intermediate pressure level at the outlet port 164 of the flow valve 160. A pressure differential between with respect to the ambient environment A generates the fluid flow through the member 120. The second pressure level can be approximately zero to two inches of water below the ambient environment A. Preferably, the second pressure level is approximately 0.88 to 1.12 inches of water below the ambient environment A with a tolerance of approximately ±0.02 inches of water.

A vacuum detection device D can be tested as follows using the vacuum-generating device 100. The pressure source P is provided at the first pressure level, the vacuum detection device D is connected to the fluid tap 142, and a vacuum relative to the ambient environment A is drawn with the vacuum generating device 100. The fluid conduit 140 and the fluid tap 142 are evacuated to the second pressure level. Evacuating the fluid conduit 140 and the fluid tap 142 can include adjusting the charge valve 130 to the closed configuration 134 such that pressure in the fluid conduit 140 changes at the first rate during the first portion of the test period. The second pressure level is regulated in response to varying fluid flow through the member 120. Regulating the second pressure level can include adjusting the charge valve 130 to the open configuration 132 and adjusting the flow valve 160 so that pressure in the fluid conduit 140 changes at the second rate during the second portion of the test period. Regulating the second pressure level can also include adjusting the flow valve 160 to vary fluid flow along a path from the ambient environment to the pressure source P. The path can include the charge valve 130 at the open configuration 132, the member 120, the fluid conduit 140, and the flow valve 160.

Testing the vacuum detection device D can further include determining that the vacuum detection device D senses vacuum at the second pressure level. The second pressure level can include a range between zero and two inches of water below the ambient environment A. Preferably, the range is between 0.88 and 1.12 inches of water below the ambient environment A.

Figure 2:
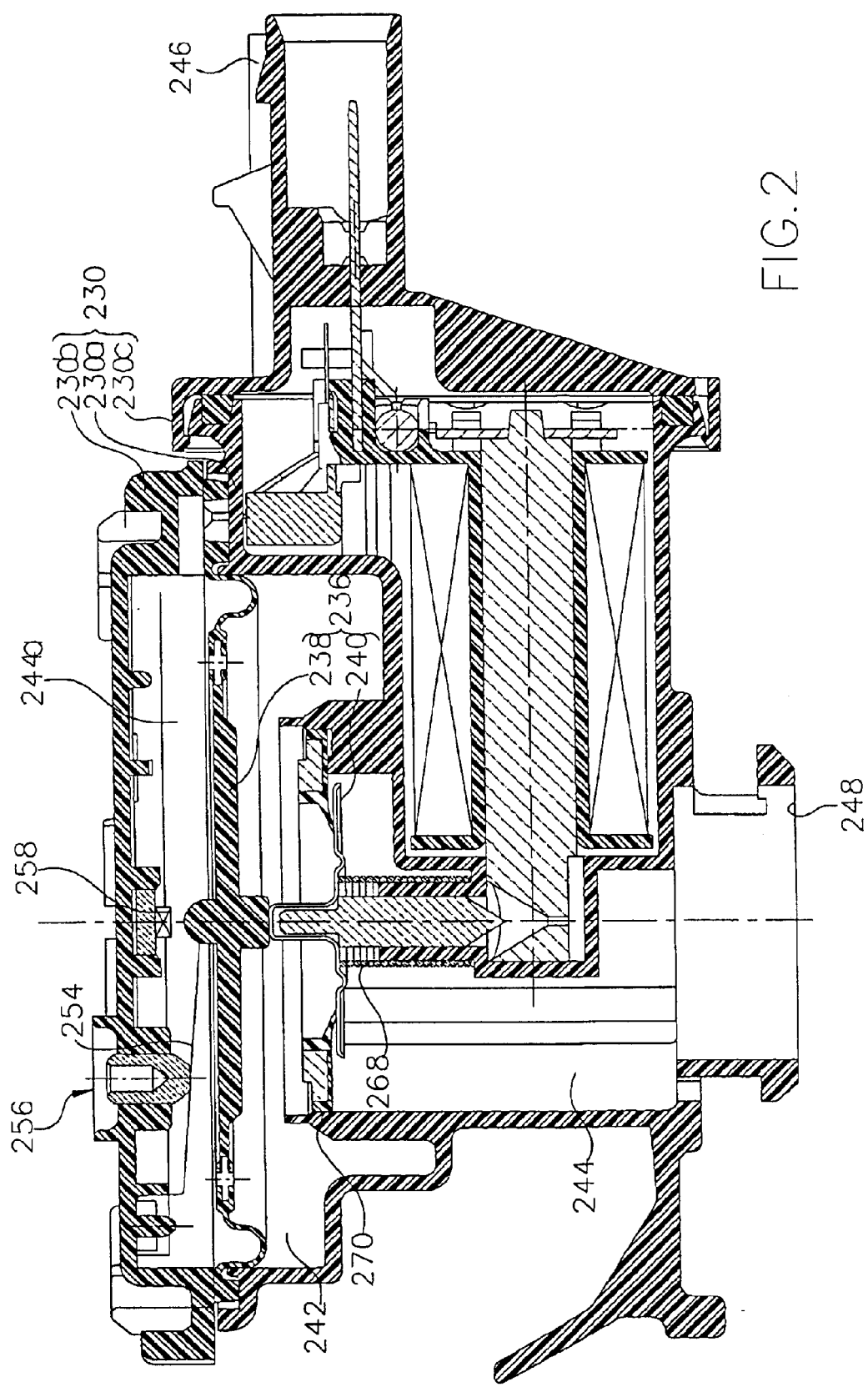
FIG. 2 is a cross-sectional view of an example of an integrated pressure management apparatus that can perform the functions of a vacuum detection device.

FIG. 2 shows an example of an integrated pressure management apparatus (IPMA) that is disclosed in U.S. patent application Ser. No. 09/542,052, "Integrated Pressure Management System for a Fuel System" (filed 31 Mar. 2001), which is hereby incorporated by reference in its entirety. The IPMA can perform the functions of the vacuum detection device D with respect to a fuel vapor recovery system, e.g., on a vehicle with an internal combustion engine. These functions can include signaling that a first predetermined pressure (vacuum) level exists, relieving pressure (vacuum) at a value below the first predetermined pressure level, and relieving pressure above a second pressure level.

Referring to FIG. 2, a preferred embodiment of the IPMA includes a housing 230 adapted to be coupled, for example, with the vacuum-generating device 10,100 via the connector 44,144. The housing 230 can be an assembly of a main housing piece 230a and housing piece covers 230b and 230c.

Signaling by the IPMA occurs when vacuum at the first predetermined pressure level is present in the fuel vapor recovery system. A pressure operable device 236 separates an interior chamber in the housing 230. The pressure operable device 236, which includes a diaphragm 238 that is operatively interconnected to a valve 240, separates the interior chamber of the housing 230 into an upper portion 242 and a lower portion 244. The upper portion 242 is in fluid communication with the ambient atmospheric pressure via a first port 246. The lower portion 244 is in fluid communicating with the fuel vapor recovery system via a second port 248, and is also in fluid communicating with a separate portion 244a. The force created as a result of vacuum in the separate portion 244a causes the diaphragm 238 to be displaced toward the housing piece cover 230b. This displacement is opposed by a resilient element 254. A calibrating screw 256 can adjust the bias of the resilient element 254 such that a desired level of vacuum will cause the diaphragm 238 to depress a switch 258. As vacuum is released, i.e., the pressure in the portions 244,244a rises, the resilient element 254 pushes the diaphragm 238 away from the switch 258.

Pressure relieving below the first predetermined pressure level occurs when vacuum in the portions 244,244a increases, i.e., the pressure decreases below the calibration level for actuating the switch 258. At some value of vacuum below the first predetermined level the vacuum will overcome the opposing force of a second resilient element 268 and displace the valve 240 away from a lip seal 270. Thus, in this open configuration of the valve 240, fluid flow is permitted from the first port 246 to the second port 248 so as to relieve excess pressure below the first predetermined pressure level.

Relieving pressure above the second predetermined pressure level occurs when a positive pressure, e.g., above ambient atmospheric pressure, is present in the fuel vapor recovery system. The valve 240 is displaced to its open configuration to provide a very low restriction path for escaping air from the second port 248 to the first port 246. Thus, when the lower portion 244 and the separate portion 244a experience positive pressure above ambient atmospheric pressure, the positive pressure displaces the diaphragm 238. This in turn displaces the valve 240 to its open configuration with respect to the lip seal 270. Thus, in this open configuration of the valve 240, fluid flow is permitted from the second port 248 to the first port 246 so as to relieve excess pressure above the second predetermined pressure level.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A vacuum generating device comprising:
   a member defining a passage extending between a first end and a second end, the passage including a constriction defining an orifice;
   a first valve connecting the first end of the member and an ambient atmospheric environment, the first valve being adjustable between first and second configurations, the first configuration permitting generally unrestricted fluid flow between the orifice and the ambient atmospheric environment, and the second configuration substantially preventing fluid flow between the orifice and the ambient atmospheric environment;
   a second valve having a first port and a second port, the first part being adapted for fluid communication with a pressure source at a first pressure level; and
   a fluid communication conduit connecting the second end of the member and the second port of the second valve, and the fluid communication conduit including a fluid communication tap at a second pressure level, the second pressure level being responsive to fluid flow through the orifice;
   wherein the first and second valves are adjustable such that a pressure in the fluid communication conduit changes at a first rate during a first portion of a test period, and the pressure in the fluid communication conduit changes at a second rate during a second portion of the test period, and the test period is up to 10 seconds.

2. The vacuum generating device according to claim 1, wherein the first rate is greater than the second rate.

3. The vacuum generating device according to claim 1, wherein the first valve is in the second configuration during the first portion of the test period, and the first valve the first configuration during the second portion of the test period.

4. A vacuum generating device, comprising:
   a member defining a passage extending between a first end and a second end, the passage including a constriction defining an orifice;
   a first valve connecting the first end of the member and an ambient environment, the first valve being adjustable between first and second configurations, the first configuration permitting generally unrestricted fluid flow between the orifice and the ambient environment, and the second configuration substantially preventing fluid flow between the orifice and the ambient environment;
   a second valve having a first port and a second port, the first port being adapted for fluid communication with a pressure source at a first pressure level; and
   a fluid communication conduit connecting the second end of the member and the second port of the second valve, and the fluid communication conduit including a fluid communication tap at a second pressure level, the second pressure level being responsive to fluid flow through the orifice;
   wherein the first and second valves are adjustable such that a pressure in the fluid communication conduit changes at a first rate during a first portion of a test period, and the pressure in the fluid communication conduit changes at a second rate during a second portion of the test period, and the test period is up to 10 seconds; and
   wherein the pressure in the fluid communication conduit during the first portion of the test period approaches the second pressure level from the ambient environment, and the pressure in the fluid communication conduit during the second portion of the test period progresses through the second pressure level.

5. A vacuum generating device, comprising:
   a member defining a passage extending between a first end and a second end, the passage including a constriction defining an orifice;
   a first valve connecting the first end of the member and an ambient environment, the first valve being adjustable between first and second configurations, the first configuration permitting generally unrestricted fluid flow between the orifice and the ambient environment, and the second configuration substantially preventing fluid flow between the orifice and the ambient environment;
   a second valve having a first port and a second port, the first port being adapted for fluid communication with a pressure source at a first pressure level; and
   a fluid communication conduit connecting the second end of the member and the second port of the second valve, and the fluid communication conduit including a fluid communication tap at a second pressure level, the second pressure level being responsive to fluid flow through the orifice;
   wherein the first and second valves are adjustable such that a pressure in the fluid communication conduit changes at a first rate during a first portion of a test period, and the pressure in the fluid communication conduit changes at a second rate during a second portion of the test period, and the test period is up to 10 seconds;
   wherein the first valve is in the second configuration during the first portion of the test period, and the first valve is in the first configuration during the second portion of the test period; and
   wherein the second pressure level is regulated during the second portion of the test period in response to the second valve varying fluid flow through the orifice.

6. A vacuum generating device, comprising:
   a member defining a passage extending between a first end and a second end, the passage including a constriction defining an orifice;

a first valve connecting the first end of the member and an ambient environment, the first valve being adjustable between first and second configurations, the first configuration permitting generally unrestricted fluid flow between the orifice and the ambient environment, and the second configuration substantially preventing fluid flow between the orifice and the ambient environment;

a second valve having a first port and a second port, the first port being adapted for fluid communication with a pressure source at a first pressure level; and a fluid communication conduit connecting the second end of the member and the second port of the second valve, and the fluid communication conduit including a fluid communication tap at a second pressure level, the second pressure level being responsive to fluid flow through the orifice;

wherein the second pressure level is approximately zero to two inches of water below the ambient environment.

7. The vacuum generating device according to claim 6, wherein the pressure source comprises a vacuum source.

8. The vacuum generating device according to claim 6, further comprising:

a filter in fluid communication with the first valve, the generally unrestricted fluid flow passing through the filter in the first configuration of the first valve.

9. The vacuum generating device according to claim 6, wherein the second valve comprises a proportional flow valve.

10. The vacuum generating device according to claim 6, wherein the fluid communication tap terminates at a connector.

11. The vacuum generating device according to claim 10, wherein the connector comprises a seal adapted for coupling with a vacuum detection device.

12. The vacuum generating device according to claim 6, wherein the second pressure level is approximately 0.88 to 1.12 inches of water below the ambient environment.

13. The vacuum generating device according to claim 12, wherein a tolerance of the second pressure level is approximately ±0.02 inches of water.

* * * * *